US011512246B2

(12) United States Patent
Juang et al.

(10) Patent No.: US 11,512,246 B2
(45) Date of Patent: Nov. 29, 2022

(54) LUMINESCENT MATERIAL AND ELECTRONIC DEVICE HAVING A DISPLAY FUNCTION USING THE SAME

(71) Applicant: Chi Mei Corporation, Tainan (TW)

(72) Inventors: Yuan-Ren Juang, Tainan (TW); Szu-Chun Yu, Tainan (TW); Keng-Chu Lin, Tainan (TW); Wei-Ta Chen, Tainan (TW); Yao-Tsung Chuang, Tainan (TW); Jen-Shrong Uen, Tainan (TW)

(73) Assignee: CHIMEI CORPORATION, Tainan (TW)

( * ) Notice: Subject to any disclaimer, the term of this patent is extended or adjusted under 35 U.S.C. 154(b) by 1031 days.

(21) Appl. No.: 16/183,860

(22) Filed: Nov. 8, 2018

(65) Prior Publication Data

US 2019/0177612 A1 Jun. 13, 2019

(30) Foreign Application Priority Data

Dec. 12, 2017 (TW) .................................. 106143619

(51) Int. Cl.
*C09K 11/02* (2006.01)
*C09K 11/54* (2006.01)
*C09K 11/56* (2006.01)
*C09K 11/88* (2006.01)

(52) U.S. Cl.
CPC .............. *C09K 11/54* (2013.01); *C09K 11/02* (2013.01); *C09K 11/025* (2013.01); *C09K 11/565* (2013.01); *C09K 11/883* (2013.01)

(58) Field of Classification Search
CPC .............................. C09K 11/00; C09K 11/025
See application file for complete search history.

(56) References Cited

U.S. PATENT DOCUMENTS

| 8,981,665 | B1 * | 3/2015 | Hamburgen | ........... | H05B 45/24 |
| | | | | | 315/291 |
| 9,382,471 | B2 | 7/2016 | Delaat et al. | | |
| 9,842,962 | B2 | 12/2017 | Woo et al. | | |
| 2012/0193605 | A1 * | 8/2012 | Gillies | ................... | B82Y 30/00 |
| | | | | | 257/13 |

FOREIGN PATENT DOCUMENTS

| CN | 105068314 A | 11/2015 |
| CN | 107699235 A | 2/2018 |
| CN | 109897638 A | 6/2019 |
| JP | 2015514154 A | 5/2015 |
| JP | 201623098 A | 2/2016 |
| KR | 20120114976 | * 10/2012 |

(Continued)

OTHER PUBLICATIONS

Barthel. Fumed Silica—Production, Properties, and Applications. OrganoSilicon Chemistry 11. 1996 (Year: 1996).*

(Continued)

*Primary Examiner* — Matthew E. Hoban
(74) *Attorney, Agent, or Firm* — McClure, Qualey & Rodack, LLP (57) ABSTRACT

A luminescent material includes a particle of an irregular shape. The particle of an irregular shape includes a core of an irregular shape and quantum dots. The quantum dots distribute on the core.

14 Claims, 7 Drawing Sheets

(56) References Cited

FOREIGN PATENT DOCUMENTS

| | | |
|---|---|---|
| KR | 20120114976 A | 10/2012 |
| KR | 20160120632 A | 10/2016 |
| TW | 201742910 A | 12/2017 |
| WO | 2018235580 A1 | 12/2018 |

OTHER PUBLICATIONS

Gelest. SIS6960.0—Silicon Dioxide, amorphous. Originally issued Sep. 14, 2015. retrieved from https://s3.amazonaws.com/gelest/sds/SIS6960.0_GHS+US_English+US.pdf Apr. 23, 2022 (Year: 2015).*

TIPO Office Action dated Nov. 22, 2018 in corresponding Taiwan application (No. 106143619).

Schreiber, et al.: "Hierarchical assembly of metal nanoparticles, quantum dots and organic dyes using DNA origami scaffolds"; nature nanotechnology; Published Online: Dec. 1, 2013 | DOI: 10.1038/NNANO.2013.253; pp. 74-78.

Schreiber, et al.: "Hierarchical assembly of metal nanoparticles, quantum dots and organic dyes using DNA origami scaffolds"; nature nanotechnology; Supplementary Information; DOI: 10.1038/NNANO.2013.253; © 2013 Macmillan Publishers Limited; pp. 1-20.

KIPO Office Action dated May 7, 2020 in KR application (No. 10-2018-0158435).

JP Office Action dated Feb. 12, 2020 in application No. 2018223018.

JPO Office Action dated Nov. 4, 2020 in JP application (No. 2018-223018).

Mandarin language Office Action date Aug. 17, 2021 in corresponding Chinese Application No. 201811314143.4.

Synthesis of N-acetyl-L-cysteine modified gold nanoparticles and its application in sensors, Dong Wenjuan, Nov. 15, 2010 (including partial English translation).

* cited by examiner

LUMINESCENT MATERIAL AND ELECTRONIC DEVICE HAVING A DISPLAY FUNCTION USING THE SAME

This application claims the benefit of Taiwan application Serial No. 106143619, filed on Dec. 12, 2017, the disclosure of which is incorporated by reference herein in its entirety.

TECHNICAL FIELD

This disclosure relates to a luminescent material and an electronic device having a display function.

BACKGROUND

Quantum dot is a kind of material having good absorption and luminescence characteristics. It has a narrow FWHM (full-width at half maximum), high luminous efficiency, and a fairly broad absorption spectrum, and thereby can provide colors of high purity and saturation. In recent years, quantum dots have been applied to display devices or other electronic devices having the display function. However, improvements in various aspects thereof still continue. For example, the provision of a luminescent material using quantum dots and having a high luminance with a low chromaticity shift is desired.

SUMMARY

This disclosure relates to a luminescent material and an electronic device having a display function. The luminescent material according to the implementations of this disclosure provides a high luminance with a low chromaticity shift.

In some implementations, a luminescent material is provided. The luminescent material comprises a particle of an irregular shape. The particle of an irregular shape includes a core of an irregular shape and quantum dots. The quantum dots distribute on the core.

In some implementations, an electronic device having a display function is provided. The electronic device comprises a luminescent material according to implementations. The electronic device is a television, a digital camera, a digital video camera, a digital photo frame, a mobile phone, a laptop, a computer monitor, a music player, a video game console, a car monitor, a smartwatch, or a VR glasses.

In the following detailed description, for purposes of explanation, numerous specific details are set forth in order to provide a thorough understanding of the disclosed implementations and embodiments. It will be apparent, however, that one or more implementations or embodiments may be practiced without these specific details. In other instances, well-known structures and devices are schematically shown in order to simplify the drawing.

DETAILED DESCRIPTION

The disclosure will be described more fully hereinafter with reference to accompanying drawings. It is appreciated that the illustration and accompanying drawings for the implementations are provided for an exemplary purpose rather than a limitation purpose. For example, in order for clarity, the relative sizes and configurations of the components in the figures may not be drawn according to reality. It is also possible to modify the choice of materials and their ratio, the elements, and/or the device without departing the scope of this disclosure, such as using the substitutes known in the art, or adding or removing some elements or structures. Furthermore, it is contemplated that elements and features of one implementation or embodiment may be beneficially incorporated into another implementation or embodiment without further recitation.

Figure 1:
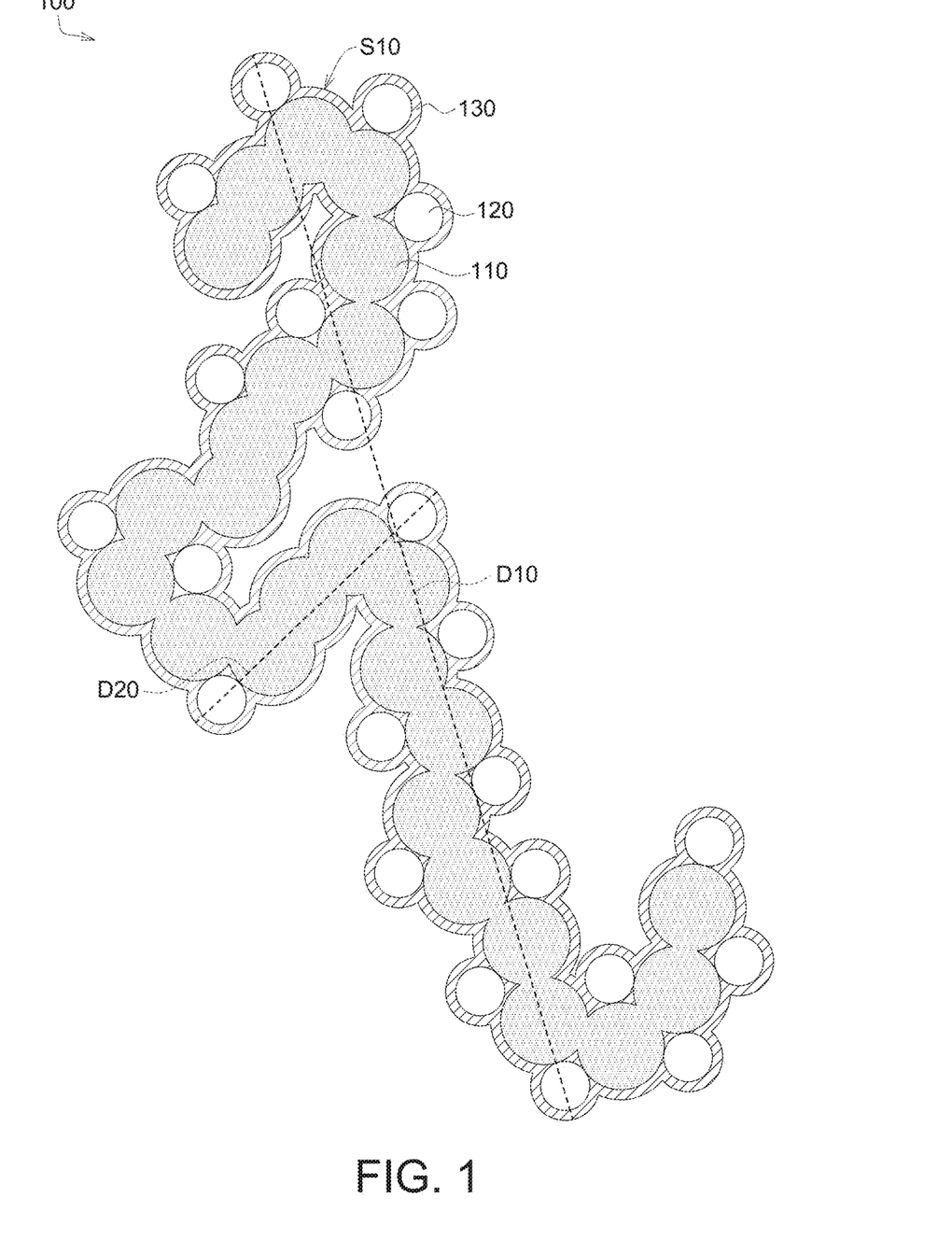
FIG. 1 shows a luminescent material according to implementations.

FIG. 1 shows a luminescent material according to implementations. The luminescent material comprises a particle 100 of an irregular shape. A particle 100 comprises a core 110 of an irregular shape and quantum dots 120. The quantum dots 120 distribute on the surface of the core 110. In some implementations, as shown in FIG. 1, each particle 100 further comprises a sealing layer 130. The sealing layer 130 seals the core 110. In such implementations, the quantum dots 120 distributing on the surface of the core 110 are located between the core 110 and the sealing layer 130. Detailed description for the particle 100, the core 110, the quantum dots 120, and the sealing layer 130 are provided in the following context.

Herein, for a particle of an irregular shape (also referred to as an irregular particle), a long axis D10 is defined as the longest line segment passing through the centroid of the particle and connecting two opposite ends of the particle contour surface S10, a short axis D20 is defined as the shortest line segment passing through the centroid of the particle and connecting two opposite ends of the particle contour surface S10, and the average particle diameter is the average value of the line segments passing through the centroid of the particle and connecting two opposite ends of the particle contour surface S10 measured at two-degree intervals. Due to the difficulty in the measurement of three-dimensional structure, the long axis, the short axis, and the average particle diameter as defined above are based on the measurement on a two-dimensional plane, and said centroid is the geometric center measured on the two-dimensional plane. For example, a scanning electron microscope (SEM) can be used for observation, and the long axis, the short axis, and the average particle diameter shown on the screen or in a photograph can be analyzed. Specific ranges for ratios of the long axes and the short axes as well as specific ranges for the average particle diameters of the irregular particles, such as a plurality of the particles 100, can therefore be decided under such definitions.

Specifically, in some implementations, the ratio of the long axis and the short axis of the irregular particle likes the particle 100 as well as a mean value of the ratios of a plurality of said particles may be from 1.30 to 20.00, such as from 1.40 to 18.00, from 1.50 to 15.00, from 2.00 to 12.00, and from 2.50 to 10.00. In some implementations, the standard deviation of said ratios of the long axes and the short axes of the irregular particles may be from 0.10 to 9.00, such as from 0.15 to 8.00, and from 0.20 to 7.00. In some implementations, the difference (between the maximum and minimum) of said ratios of the long axes and the short axes of the irregular particles may be from 0.20 to 30.00, such as from 1.50 to 28.00, and from 3.00 to 25.00.

Figure 2A:
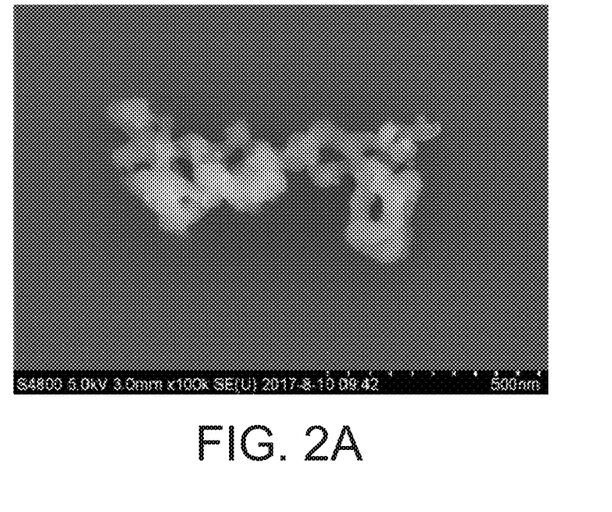
FIGS. 2A and 2B are SEM photographs of a luminescent material according to implementations.
Figure 2B:
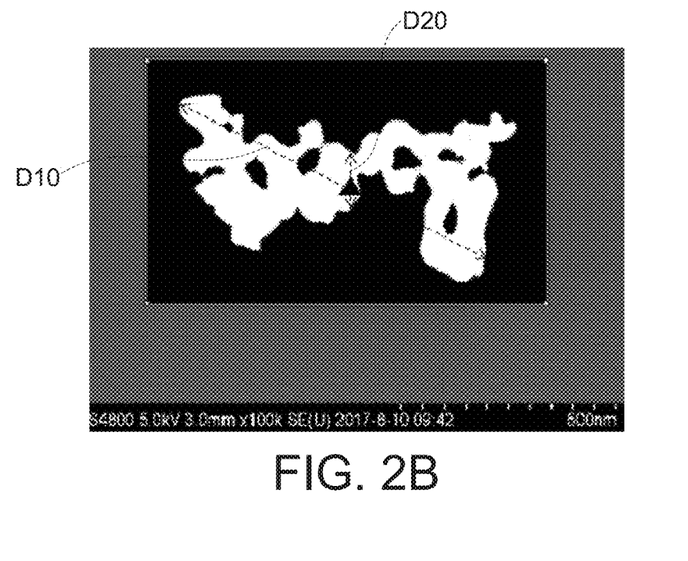

For example, FIGS. 2A and 2B show SEM photographs of a luminescent material according to implementations, wherein in FIG. 2A, a specific particle of an irregular shape is shown, and in FIG. 2B, the centroid (triangle mark), the long axis (D10 line segment), and the short axis (D20 line segment) thereof are further designated. In FIG. 2B, the irregular particle, of which the centroid is designated by the triangle mark, have a long axis D10 of about 790.5 nm, a short axis D20 of about 121.6 nm, and a ratio of the long axis and the short axis of about 6.50. These values of sizes are all in the ranges described above. In some implementations, the average particle diameters of the irregular particles are from 144.6 nm to 400.0 nm, and a mean size calculated from the average particle diameters of over twenty particles may be about 263 nm.

In this disclosure, a particle of an irregular shape is used. Said irregular shape refers to a particle shape with a non-periodical contour on a two-dimensional plane, which means that the contour is not constituted by any repeating geometric shapes generally known in the art in which each geometric shape can be easily recognized. Said geometric shapes comprise, but not limited to, a circle, an ellipse, a rectangle, a square, a diamond, a triangle, a trapezoid, and the like. For said irregular shape, a contour on a two-dimensional plane which is not constituted by one or more elements selected from the group consisting of circles, ellipses, rectangles, squares, diamonds, triangles, trapezoids, and the like is preferred.

The material of the core 110 may be a polymer, and the suitable polymers comprise organic polymers, inorganic polymers, water soluble polymers, organic solvent soluble polymers, biopolymers, and synthetic polymers, such as, but not limited to, polysiloxane, polyacrylate, polycarbonate, polystyrene, polyethylene, polypropylene, polyketone, polyetheretherketone, polyester, polyamide, polyimide, polyacrylamide, polyolefin, polyacetylene, polyisoprene, polybutadiene, poly(vinylidene fluoride), polyvinyl chloride, ethylene vinyl acetate, polyethylene terephthalate, polyurethane, and/or cellulosic polymers. The material of the core 110 may also be an inorganic media other than the polymers, such as, but not limited to, silica gel, bentonite, glass, quartz, kaolin, silicon dioxide ($SiO_2$), aluminum oxide, and/or zinc oxide. In some implementations, fumed silica is preferred for the core 110. Fumed silica may be aggregates of multiple primary particles, wherein the primary particles of each aggregate are substantially combined and cannot be separated, as shown in FIG. 1. The core 110 may be a core of an irregular shape. Said irregular shape refers to a core shape with a non-periodical contour on a two-dimensional plane, which means that the contour is not constituted by any repeating geometric shapes generally known in the art in which each geometric shape can be easily recognized. Said geometric shapes comprise, but not limited to, a circle, an ellipse, a rectangle, a square, a diamond, a triangle, a trapezoid, and the like. For said irregular shape, a contour on a two-dimensional plane which is not constituted by one or more elements selected from the group consisting of circles, ellipses, rectangles, squares, diamonds, triangles, trapezoids, and the like is preferred.

In some implementations, the ratio of a long axis and a short axis of the core 110 of an irregular shape may be from 1.30 to 20.00, such as from 1.40 to 18.00, and from 1.50 to 15.00. Herein, for a core 110 of an irregular shape, the long axis is defined as the longest line segment passing through the centroid of the core 110 and connecting two opposite ends of the contour surface of the core 110, and the short axis is defined as the shortest line segment passing through the centroid of the core 110 and connecting two opposite ends of the contour surface of the core 110.

According to some implementations, the core 110 may be hydrophobic. For example, a core 110 may comprises an alkyl group having 3 carbons to 20 carbons (C3-C20 alkyl groups), such as an alkyl group having 3 carbons to 18 carbons (C3-C18 alkyl groups), and an alkyl group having 3 carbons to 16 carbons (C3-C16 alkyl groups). The hydrophobicity is thereby provided by such an alkyl group. In some implementations, the alkyl group is grafted onto the aggregates by modifying (surface treating) the aggregates having hydrophilic silanol groups on their surface using an organosilane, so as to form the core 110. In such implementations, the core 110 will have an end functional group as shown in Chemical Formula 1 on its surface:

[Chemical Formula 1]

wherein $R^1$ is —$OCH_3$, $R^2$ is —$OCH_3$, $R^3$ is a C3-C20 alkyl group, such as a C3-C18 alkyl group, and a C3-C16 alkyl group. Correspondingly, the organosilane for modification may be an organosilane having a C3-C20 alkyl group, such as an organosilane having a C3-C18 alkyl group, and an organosilane having a C3-C16 alkyl group. For example, propyl trimethoxysilane, octyl trimethoxysilane, hexadecyl trimethoxysilane, or the like may be used.

According to some implementations, by the measurement using thermogravimetric analyzer (TGA) from 25° C. to 800° C., a total residual weight of a core 110 may be from 94% to 100%, such as from 95% to 100%, and from 96% to 100%. When a core 110 has a total residual weight measured by TGA from 25° C. to 800° C. in the ranges described above, the core 110 has less impurities, higher mechanical strength, and excellent heat resistance, and thereby the reliability of the overall luminescent material can be improved.

An irregular core 110 can provide suitable distances between the quantum dots 120, so as to prevent the loss of luminescence characteristic, which may be due to the condition that the quantum dots 120 are too close to each other. In particular, even in the conditions in which the adsorption amount of the quantum dots 120 is high, the quantum dots 120 can still be separated from each other by suitable distances, and problems caused by the insufficient distances between the quantum dots 120, such as the loss of luminescence characteristic, the decrease of luminance, and the significant shift of chromaticity, can thereby be prevented. In some implementations, a specific surface area of a core 110 may be from 100 $m^2/g$ to 1000 $m^2/g$.

The quantum dots 120 may be silicon based nanocrystals, Group 12-16 semiconductor nanocrystals, Group 13-15 semiconductor nanocrystals, Group 14-16 semiconductor nanocrystals, perovskite nanocrystals, and/or the like. For the Group 12-16 semiconductor nanocrystals, the Group 12 element(s) may be Zn, Cd, and/or Hg, the Group 16 element(s) may be O, S, Se, and/or Te, and the Group 12-16 compound(s) may be, but not limited to, CdO, CdS, CdSe, CdTe, ZnO, ZnS, ZnSe, ZnTe, HgO, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, CdZnSeS, CdZnSeTe, CdZnSTe, CdHgSeS, CdHgSeTe, CdHgSTe, HgZnSeS, HgZnSeTe, and/or HgZnSTe. For the Group 13-15 semiconductor nanocrystals, the Group 13 element(s) may be Al, Ga, and/or In, the Group 15 element(s) may be N, P, and/or As, and the Group 13-15 compound(s) may be, but not limited to, GaN, GaP, GaAs, AlN, AlP, AlAs, InN, InP, InAs, GaNP, GaNAs, GaPAs, AlNP, AlNAs, AlPAs, InNP, InNAs, InPAs, GaAlNP, GaAlNAs, GaAlPAs, GaInNP, GaInNAs, GaInPAs, InAlNP, InAlNAs, InCuSe, and/or InAlPAs. For the Group 14-16 semiconductor nanocrystals, the Group 14 element(s) may be Sn and/or Pb, the Group 16 element(s) may be S, Se, and/or Te, and the Group 14-16 compound(s) may be, but not limited to, SnS, SnSe, SnTe, PbS, PbSe, PbTe, SnSeS, SnSeTe, SnSTe, PbSeS, PbSeTe, PbSTe, SnPbS, SnPbSe, SnPbTe, SnPbSSe, SnPbSeTe, and/or SnPbSTe. For the perovskite nanocrystals, an organometallic halide $RNH_3PbX_3$ or a pure inorganic perovskite $CsPbX_3$ may be used, wherein R may be $C_nH_{2n+1}$, n may be 1 to 10, X may be Cl, Br, and/or I, and the perovskite compound(s) may be, but not limited to, $CH_3NH_3PbI_3$, $CH_3NH_3PbCl_3$, $CH_3NH_3PbBr_3$, $CH_3NH_3PbI_2Cl$, $CH_3NH_3PbICl_2$, $CH_3NH_3PbI_2Br$, $CH_3NH_3PbIBr_2$, $CH_3NH_3PbIClBr$, $CsPbI_3$, $CsPbCl_3$, $CsPbBr_3$, $CsPbI_2Cl$, $CsPbICl_2$, $CsPbI_2Br$, $CsPbIBr_2$, and/or $CsPbIClBr$.

According to some implementations, the quantum dots 120 may have structures of binary cores, ternary cores, quaternary cores, or the like. According to some implementations, the quantum dots 120 may have structures of core/shell or core/multi-shell. In some implementations, the quantum dots 120 may be doped or classified. In some implementations, nanoparticles with CdSe core/ZnS shell structure are preferred.

According to some implementations, inorganic atoms on the surface of the quantum dots 120 may be surface modified using a sealing agent, so as to suppress the aggregation of the quantum dots 120 and moderately isolate the quantum dots 120 from the surrounding electrons and chemical environment. The sealing agent is organic group(s), and may comprise or substantially consist of Lewis base compound. The sealing agent includes a monofunctional or multifunctional ligand. For example, the sealing agent may be, but not limited to, phosphine, such as trioctylphosphine, triphenylphosphine, tri-tert-butylphosphine, or the like, phosphine oxide, such as trioctylphosphine oxide, triphenylphosphine oxide, or the like, alkyl phosphonic acid, alkylamines, such as cetylamine, octylamine, or the like, arylamine, pyridine, long chain fatty acid, and/or thiophene.

The change of the average particle diameters of the quantum dots will lead to a corresponding change of the emission wavelength. As such, the peak wavelength of the light emitted from the quantum dot can be controlled through the adjustment of the material and size of the quantum dots. In some implementations, the average particle diameters of the quantum dots 120 are from 1 nm to 25 nm, such as from 1 nm to 15 nm, and from 1 nm to 10 nm. The quantum dots 120 may comprise red quantum dots emitting red light, green quantum dots emitting green light, and blue quantum dots emitting blue light. In some implementations, the red quantum dots have average particle diameters from 3 nm to 25 nm, such as from 4 nm to 15 nm, and from 5 nm to 10 nm. The green quantum dots have average particle diameters from 2 nm to 20 nm, such as from 3 nm to 15 nm, and from 4 nm to 9 nm. The blue quantum dots have average particle diameters from 1 nm to 15 nm, such as from 2 nm to 10 nm, and from 2 nm to 8 nm.

In some implementations, when the quantum dots 120 are evaluated by photoluminescence (PL), the light having a wavelength of 350 nm or higher but less than the emission wavelength of the quantum dots 120 (such as 390 nm to 500 nm) is used to irradiate the quantum dots 120, and the quantum dots 120 emit light having a peak wavelength from 400 nm to 700 nm with a peak FWHM from 15 nm to 60 nm, such as from 20 nm to 60 nm. In some implementations, the red quantum dots emit light having a peak wavelength from 600 nm to 700 nm, such as from 605 nm to 680 nm, and from 610 nm to 660 nm, with a peak FWHM from 15 nm to 60 nm, such as from 20 nm to 60 nm. The green quantum dots emit light having a peak wavelength from 500 nm to 600 nm, such as from 510 nm to 560 nm, and from 520 nm to 550 nm, with a peak FWHM from 15 nm to 60 nm, such as from 20 nm to 60 nm. The blue quantum dots emit light having a peak wavelength from 400 nm to 500 nm, such as from 430 nm to 470 nm, and from 440 nm to 460 nm, with a peak FWHM from 15 nm to 60 nm, such as from 20 nm to 60 nm. The PL analysis can be conducted using a Steady-State Spectrofluorometers FluoroMax-3 from HORIBA, Ltd., but not limited thereto.

According to some implementations, with respect to 100 weight parts of the core 110, the quantum dots 120 may be 0.2 weight parts to 50 weight parts. In this range, the luminance of said luminescent material can stably increase corresponding to the increase of the amount of the quantum dots 120 without a significant shift of chromaticity.

The material of the sealing layer 130 may be a polymer, and the suitable polymers comprise organic polymers, inorganic polymers, water soluble polymers, organic solvent soluble polymers, biopolymers, and synthetic polymers, such as, but not limited to, polysiloxane, polyacrylate, polycarbonate, polystyrene, polyethylene, polypropylene, polyketone, polyetheretherketone, polyester, polyamide, polyimide, polyacrylamide, polyolefin, polyacetylene, polyisoprene, polybutadiene, poly(vinylidene fluoride), polyvinyl chloride, ethylene vinyl acetate, polyethylene terephthalate, polyurethane, and/or cellulosic polymers. The material of the sealing layer 130 may also be an inorganic media other than the polymers, such as, but not limited to, silica gel, bentonite, glass, quartz, kaolin, silicon dioxide ($SiO_2$), aluminum oxide, and/or zinc oxide. In some implementations, silicon oxide is preferred, such as, but not limited to, polysiloxane, glass, and/or $SiO_2$. Said polysiloxane is obtained by hydrolysis condensation from siloxane compound $R^a{}_nSi(OR^b)_{4-n}$, wherein $R^a$ is an aryl group having 6 carbons to 15 carbons, $R^b$ is an alkyl group having 1 carbon to 5 carbons, n is 0 to 3. For example, $R^a$ may be, but not limited to, phenyl group, tolyl group, p-hydroxyphenyl group, 1-(p-hydroxyphenyl)ethyl group, 2-(p-hydroxyphenyl)ethyl group, (4-hydroxy-5-(p-hydroxyphenylcarbonyloxy)pentyl) group, or naphthyl group, and $R^b$ may be, but not limited to, methyl group, ethyl group, n-propyl group, isopropyl group, or n-butyl group. In some implementations, the polysiloxane obtained by hydrolysis condensation from tetraethoxysilane (TEOS) is preferred.

According to some implementations, as long as the sealing layer 130 can completely seal the quantum dots 120, the thickness of the sealing layer 130 is acceptable. For example, the thickness of the sealing layer 130 may be from 0.1 nm to 25 nm, or 0.5 nm to 25 nm. The sealing layer 130 having the thickness in the above range can provide the quantum dots 120 with enough protection, while prevent the decrease of luminescence due to the condition that the quantum dots 120 are too far away from the particle surfaces. In some implementations, for a particle as described above, such as a particle 100, a carbon content of the particle is from 0.50 wt % to 11.00 wt % with respect to 100 wt % of a total weight of the particle.

In a luminescent material according to implementations, the quantum dots 120 are incorporated into optically transparent mediums (the core 110 and the sealing layer 130). As such, the quantum dots 120 can be optically communicated with the light source. Thereby, the quantum dots 120 can be excited by primary light emitted from the light source and emit secondary light. The light source that can be used comprises, but not limited to, a light emitting diode (LED) source, a laser source, an arc lamp, or a black body light source. In some implementations, the desired intensity and wavelength of the light emitted by the overall device may be provided by only the secondary light. In some other implementations, the desired intensity and wavelength of the light emitted by the overall device may be provided by suitably mixing the colors of the primary light and secondary light. In some implementations, the size, configuration, and composition of the optically transparent mediums as well as the size and amount of each type of the quantum dots in the optically transparent mediums can be controlled, such that the light emitted by the luminescent material can provide any specific desired color and intensity of light after subsequent light mixing. According to some implementations, a luminescent material may comprise quantum dots of one or more colors.

In a luminescent material according to implementations, since the quantum dots 120 are distributed on the core 110 of an irregular shape, the luminance of the luminescent material can be adjusted to a high level, even to an extremely high luminance, without a significant shift of chromaticity. More specifically, compared to a general spherical core, the irregular core 110 has a higher specific surface area. As such, even in the condition that the adsorption amount of the quantum dots 120 increases, high dispersion of the quantum dots 120 can be maintained, which allows the quantum dots 120 separated from each other by suitable distances, and thereby problems caused by the insufficient distances between the quantum dots 120, such as the increase of self-absorption of light, the decrease of luminance, and the significant shift of chromaticity, can thereby be prevented.

According to some implementations, said luminescent material can be applied to the encapsulation material for LED. The encapsulation material that can be used may be, but not limited to, epoxy resin, polysiloxane resin, acrylate resin, or glass. Such LEDs can be used, for example, as the luminescence components of a backlight or any other luminescence device, or as pixels in the array of a QLED display device. According to some implementations, said luminescent material may also be applied to an optical film, an optical sheet, a transparent tube, an optical component, a backlight unit, a color conversion material, an optical material, an ink, a labeling agent, or the like.

Figure 3A:
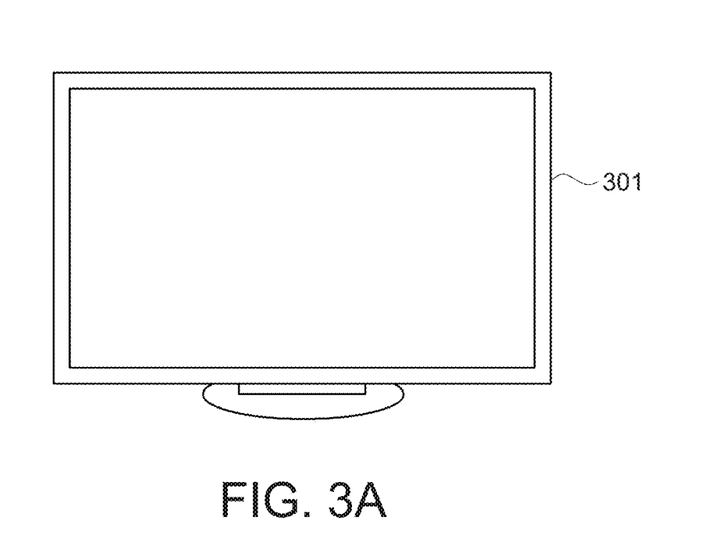
FIGS. 3A to 3J show various electronic devices using the luminescent material according to implementations.
Figure 3B:
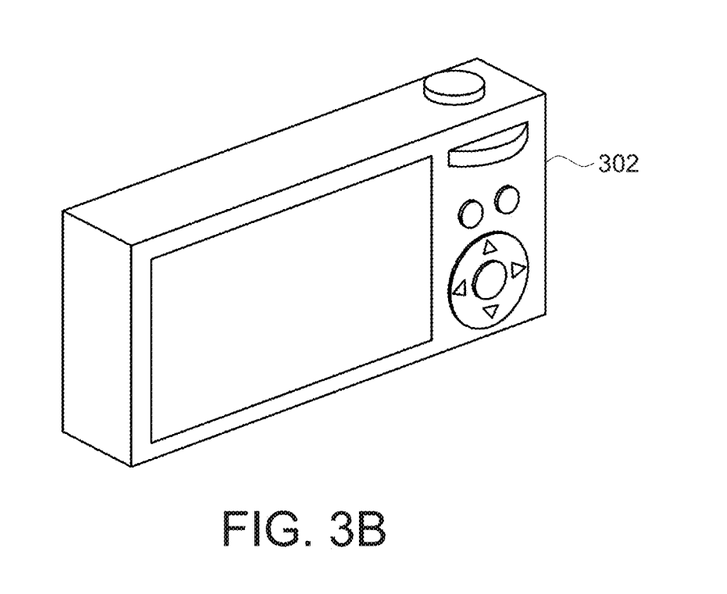
Figure 3C:
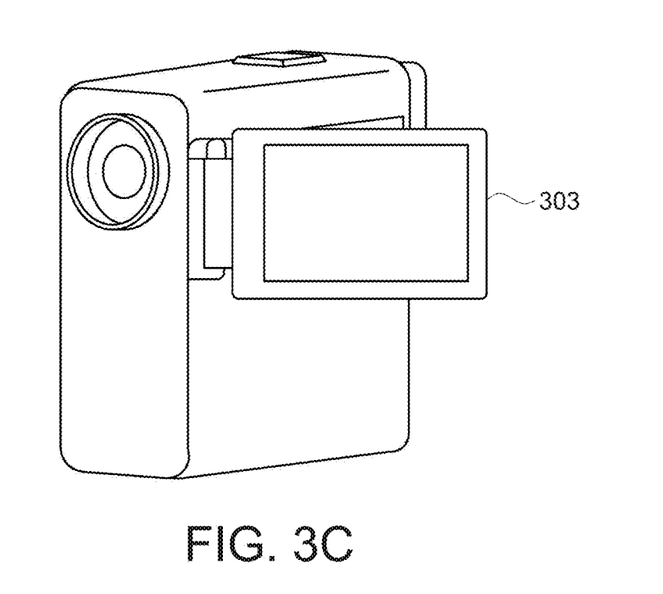
Figure 3D:
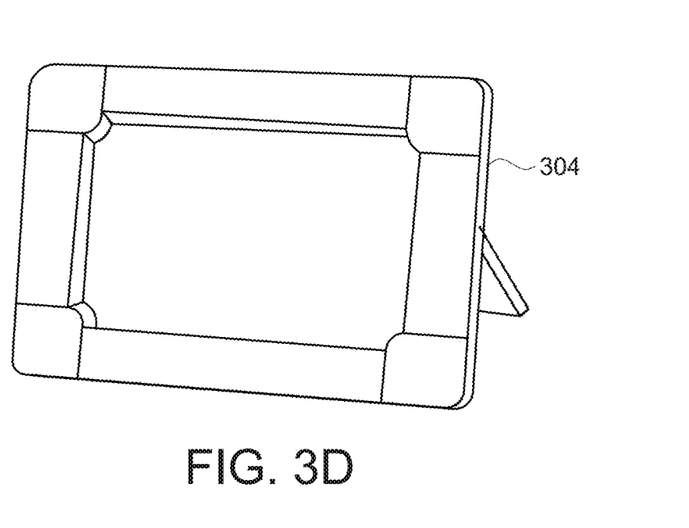
Figure 3E:
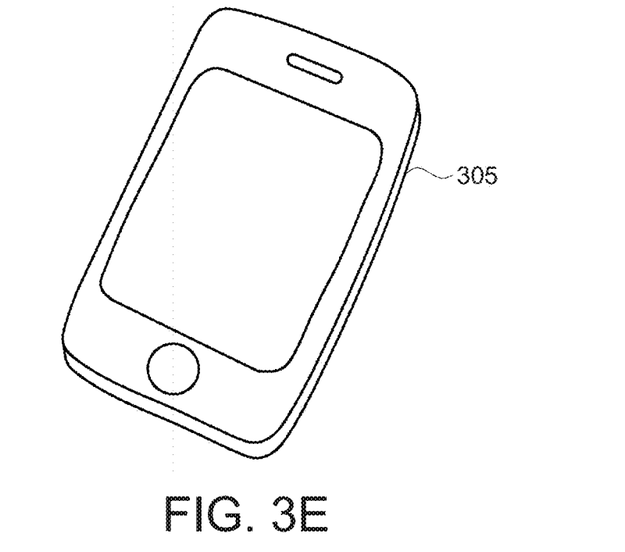
Figure 3F:
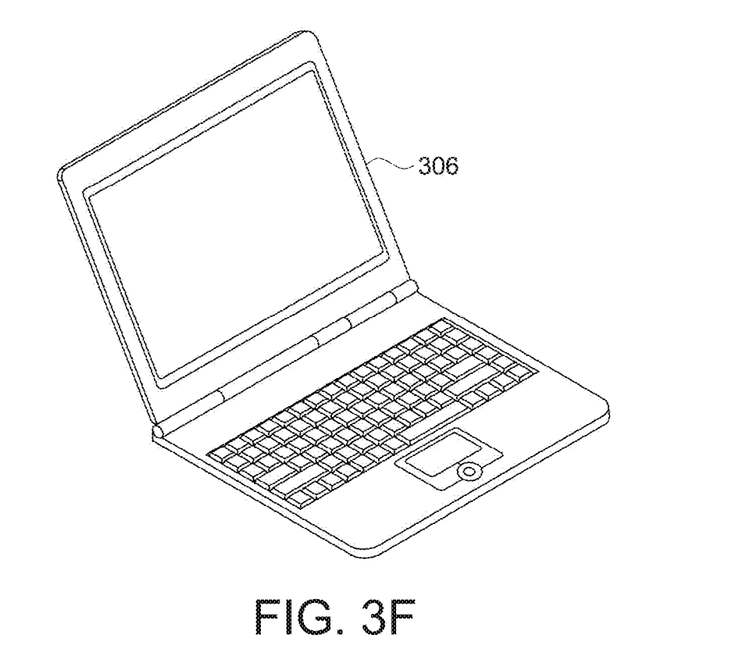
Figure 3G:
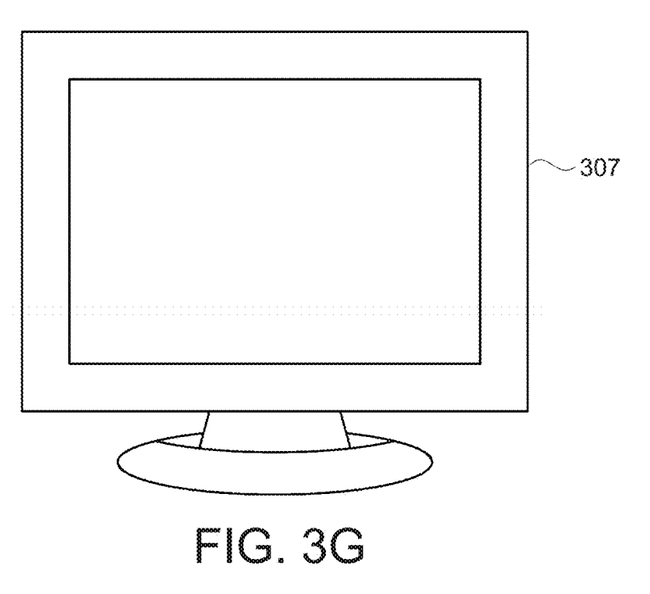
Figure 3H:
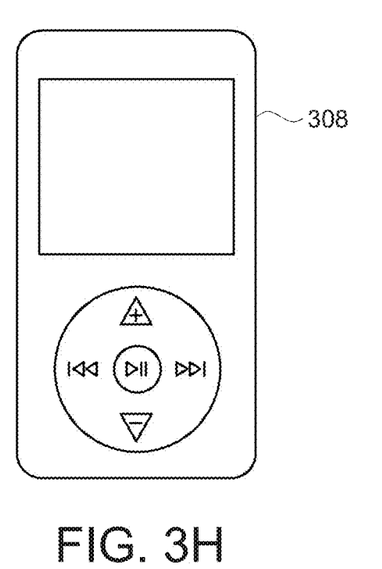
Figure 3I:
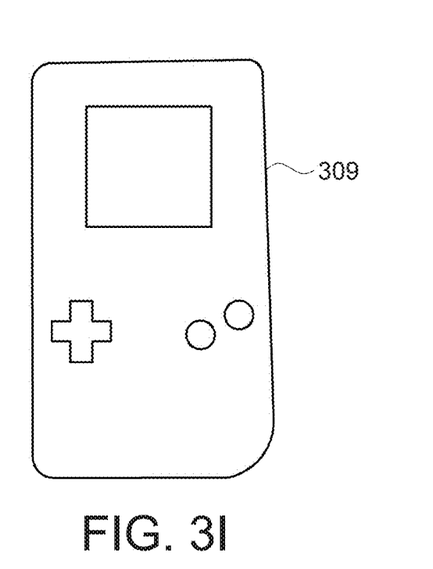
Figure 3J:
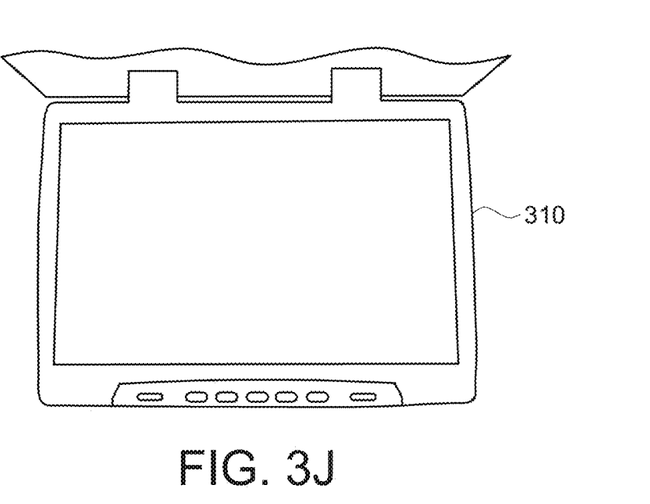

According to some implementations, said luminescent material can further be applied to electronic devices, such as an electronic device having a display function. In other words, said electronic device comprises a luminescent material according to implementations. The electronic device having a display function may be a television 301 as shown in FIG. 3A, a digital camera 302 as shown in FIG. 3B, a digital video camera 303 as shown in FIG. 3C, a digital photo frame 304 as shown in FIG. 3D, a mobile phone 305 as shown in FIG. 3E, a laptop 306 as shown in FIG. 3F, a computer monitor 307 as shown in FIG. 3G, a music player 308 as shown in FIG. 3H, a video game console 309 as shown in FIG. 3I, a car monitor 310 as shown in FIG. 3J, a wearable device like a smartwatch or a VR glasses, or the like.

For a further understanding to the luminescent materials according to the implementations, specific embodiments and comparative embodiments are provided in the following context.

[Preparation of Quantum Dots Solutions]
[Quantum Dots Solution (1)]

First, 260 mg of cadmium oxide (CdO), 7020 mg of zinc acetate (ZnAc), and 45 mg of oleic acid were added into a three-neck flask, and 140 ml of octadecene (ODE) was further added into the three-neck flask. Mixing and reaction were conducted at 120° C. in a vacuum environment. Nitrogen gas was then filled into the three-neck flask, and the temperature was raised to 250° C. Thereafter, 20 ml of 0.025 mole of trioctylphosphine selenide (TOPSe) and 1080 mg of sulfur (S) were introduced into the solution, and the solution was heated at 250° C. After stirring, a yellowish-green suspension was formed. The suspension was cooled, and precipitated using 300 ml of ethanol. The centrifuged precipitates were green quantum dots, which can emit a light with a peak wavelength of 530 nm and a FWHM of 40 nm. The solvent was removed from the green quantum dots. Then, the green quantum dots were mixed with n-hexane to form a green quantum dots solution having 1 wt % of the green quantum dots. It was Quantum Dots Solution (1).

[Preparation of Cores Solutions]
[Cores Solution (1)]

First, 1 g of fumed silica (SIS6960.0, Gelest, Inc.) was dispersed in 40 g of dimethyl sulfoxide, and 0.2 g of hexadecyl trimethoxysilane was added as the modifier. The mixture was heated to 85° C. under a nitrogen atmosphere, and was stirred and reacted for 72 hours. After centrifugation and washing with ethanol for three times, the solvent was removed by vacuum drying, and irregular hydrophobic fumed silica was obtained and used as Cores (1). Cores (1) were irregular cores with C16 alkyl groups. By the TGA measurement from 25° C. to 800° C., a total residual weight of Cores (1) was 97.7%. Cores (1) were mixed with n-hexane to form a cores solution having 5 wt % of the cores. It was Cores Solution (1).

[Cores Solution (2)]

First, 1 g of fumed silica (SIS6960.0, Gelest, Inc.) was dispersed in 40 g of dimethyl sulfoxide, and 0.2 g of propyl trimethoxysilane was added as the modifier. The mixture was heated to 85° C. under a nitrogen atmosphere, and was stirred and reacted for 72 hours. After centrifugation and washing with ethanol for three times, the solvent was removed by vacuum drying, and irregular hydrophobic fumed silica was obtained and used as Cores (2). Cores (2) were irregular cores with C3 alkyl groups. Cores (2) were mixed with n-hexane to form a cores solution having 5 wt % of the cores. It was Cores Solution (2).

[Cores Solution (3)]

Spherical hydrophobic $SiO_2$ having an average particle diameter of 0.15 μm and substantially having no holes on the surface was used as Cores (3). Cores (3) were small-sized regular spherical non-porous cores. By the TGA measurement from 25° C. to 800° C., a total residual weight of Cores (3) was 93.0%. Cores (3) were mixed with n-hexane to form a cores solution having 5 wt % of the cores. It was Cores Solution (3).

[Cores Solution (4)]

Spherical hydrophobic $SiO_2$ having an average particle diameter of 40 μm and being porous was used as Cores (4). Cores (4) were large-sized regular spherical porous cores. Cores (4) were mixed with n-hexane to form a cores solution having 5 wt % of the cores. It was Cores Solution (4).

PREPARATION FOR EMBODIMENTS AND COMPARATIVE EMBODIMENTS

Embodiment 1

First, 0.05 g of Quantum Dots Solution (1) was mixed with 5 g of Cores Solution (1), and the mixture was stood for 10 minutes. Then, centrifugation was conducted at 10,000 rpm, and cores with quantum dots adhered thereon were obtained. The adsorption amount of the quantum dots is listed in Table 1. The cores with quantum dots adhered thereon were added into 250 g of ethanol and dispersed evenly. Then, 0.5 g of TEOS and 2.5 g of 29 wt % of ammonia water ($NH_4OH$) were added, and the mixture was stirred at room temperature for 4 hours. At that time, the mixture was between pH 10 and pH 11. After centrifugation conducted at 10,000 rpm and washing with ethanol for three times, micro-sized particles of irregular shapes were obtained.

Embodiments 2 to 7 and Comparative Embodiments 1 to 13

The implementations were similar to Embodiment 1, but for each Embodiment or Comparative Embodiment, Quantum Dots Solution (1) was mixed with one of Cores Solutions (1) to (4) or not mixed with any cores solution based on the ratios listed in Table 1.

TABLE 1

| | Quantum Dots Solution (g) | Cores Solution (g) | | | | | Adsorption Amount of the Quantum Dots (wt %) |
|---|---|---|---|---|---|---|---|
| | (1) | (1) | (2) | (3) | (4) | Cores | |
| Embodiment 1 | 0.05 | 5 | — | — | — | Cores (1) | 0.2 |
| Embodiment 2 | 0.5 | 5 | — | — | — | Cores (1) | 2.0 |
| Embodiment 3 | 2.5 | 5 | — | — | — | Cores (1) | 10.0 |
| Embodiment 4 | 5 | — | 5 | — | — | Cores (2) | 20.0 |
| Embodiment 5 | 7.5 | 5 | — | — | — | Cores (1) | 30.0 |
| Embodiment 6 | 10 | 5 | — | — | — | Cores (1) | 40.0 |
| Embodiment 7 | 12.5 | 5 | — | — | — | Cores (1) | 50.0 |
| Comparative Embodiment 1 | 0.05 | — | — | — | — | N/A | — |
| Comparative Embodiment 2 | 0.5 | — | — | — | — | N/A | — |
| Comparative Embodiment 3 | 2.5 | — | — | — | — | N/A | — |
| Comparative Embodiment 4 | 5 | — | — | — | — | N/A | — |
| Comparative Embodiment 5 | 10 | — | — | — | — | N/A | — |
| Comparative Embodiment 6 | 0.05 | — | — | 5 | — | Cores (3) | 0.2 |
| Comparative Embodiment 7 | 0.5 | — | — | 5 | — | Cores (3) | 2.0 |
| Comparative Embodiment 8 | 2.5 | — | — | 5 | — | Cores (3) | 10.0 |
| Comparative Embodiment 9 | 5 | — | — | 5 | — | Cores (3) | 20.0 |
| Comparative Embodiment 10 | 0.05 | — | — | — | 5 | Cores (4) | 0.2 |
| Comparative Embodiment 11 | 0.5 | — | — | — | 5 | Cores (4) | 2.0 |
| Comparative Embodiment 12 | 2.5 | — | — | — | 5 | Cores (4) | 10.0 |
| Comparative Embodiment 13 | 5 | — | — | — | 5 | Cores (4) | 20.0 |

[Measurement and Analysis of Dimensional Characteristics]

The irregular particles of Embodiment 5 were dispersed with ethanol. Then, SEM was used to observe the dispersed particles, and the software image-pro Plus 6.0 was used to select particular particles and calculate dimensional characteristics such as the particle sizes. Table 2 shows the results of the dimensional analysis of 21 of these particles. For the particles of this luminescent material, ratios of the long axes and the short axes are from 1.78 to 14.66, the mean value of the long axes is about 503.6 nm, the mean value of the short axes is about 107.6 nm, the mean value of said ratios (of the long axes and the short axes) is about 6.12, the standard deviation of said ratios is about 3.72, the difference (between the maximum and minimum) of said ratios is about 12.88, and the mean value of the average particle diameters (i.e., the mean size described in the paragraphs with respect to FIG. 1) is about 263.3 nm.

TABLE 2

| No. | Long Axis (nm) | Short Axis (nm) | Ratio of the Long Axis and the Short Axis | Average Particle Diameter (nm) |
|---|---|---|---|---|
| 1 | 443.1 | 57.2 | 7.74 | 182.0 |
| 2 | 252.3 | 106.0 | 2.38 | 173.1 |
| 3 | 388.4 | 154.2 | 2.52 | 273.7 |
| 4 | 249.6 | 17.0 | 14.66 | 139.2 |
| 5 | 790.5 | 121.6 | 6.50 | 316.8 |
| 6 | 902.1 | 105.3 | 8.56 | 398.9 |
| 7 | 395.2 | 133.8 | 2.95 | 216.1 |
| 8 | 351.8 | 59.5 | 5.92 | 201.8 |
| 9 | 343.8 | 127.1 | 2.70 | 242.7 |
| 10 | 303.0 | 87.4 | 3.47 | 183.7 |
| 11 | 461.6 | 259.3 | 1.78 | 342.5 |
| 12 | 289.7 | 24.0 | 12.05 | 144.6 |
| 13 | 313.8 | 119.0 | 2.64 | 182.3 |
| 14 | 455.2 | 171.3 | 2.66 | 265.9 |
| 15 | 837.0 | 89.8 | 9.32 | 400.0 |
| 16 | 464.7 | 129.8 | 3.58 | 251.2 |
| 17 | 718.3 | 103.0 | 6.97 | 329.9 |
| 18 | 650.8 | 189.4 | 3.44 | 397.1 |
| 19 | 801.2 | 76.9 | 10.42 | 338.5 |
| 20 | 561.4 | 57.8 | 9.71 | 280.4 |
| 21 | 603.0 | 70.9 | 8.50 | 270.2 |
| Mean Value | 503.6 | 107.6 | 6.12 | 263.3 |

The particles having spherical cores of Comparative Embodiments 6 to 13 were dispersed with ethanol. Then, SEM was used to observe the dispersed particles, and the software image-pro Plus 6.0 was used to select particular particles and calculate dimensional characteristics such as the particle sizes. For these kinds of particles, which have spherical cores, ratios of the long axes and the short axes were from 1.05 to 1.29. For example, as to the particles of Comparative Embodiment 8 with spherical cores, Table 3 shows the results of the dimensional analysis of 21 of these particles. For this kind of particles having spherical cores, ratios of the long axes and the short axes are from 1.10 to 1.29, the mean value of said ratios (of the long axes and the short axes) is about 1.17, the standard deviation of said ratios is about 0.05, and the difference (between the maximum and minimum) of said ratios is about 0.19.

TABLE 3

| No. | Long Axis (nm) | Short Axis (nm) | Ratio of the Long Axis and the Short Axis | Average Particle Diameter (nm) |
|---|---|---|---|---|
| 1 | 107.4 | 89.3 | 1.20 | 99.8 |
| 2 | 116.2 | 102.1 | 1.14 | 109.6 |
| 3 | 128.3 | 109.0 | 1.18 | 118.1 |

TABLE 3-continued

| No. | Long Axis (nm) | Short Axis (nm) | Ratio of the Long Axis and the Short Axis | Average Particle Diameter (nm) |
|---|---|---|---|---|
| 4 | 113.9 | 102.2 | 1.11 | 107.2 |
| 5 | 97.7 | 80.8 | 1.21 | 88.3 |
| 6 | 116.2 | 99.6 | 1.17 | 108.5 |
| 7 | 111.2 | 86.4 | 1.29 | 99.3 |
| 8 | 127.6 | 115.9 | 1.10 | 120.5 |
| 9 | 112.1 | 96.2 | 1.17 | 105.5 |
| 10 | 137.6 | 112.5 | 1.22 | 124.4 |
| 11 | 121.8 | 101.4 | 1.20 | 110.6 |
| 12 | 113.8 | 92.6 | 1.23 | 104.1 |
| 13 | 124.8 | 111.6 | 1.12 | 118.2 |
| 14 | 128.5 | 115.8 | 1.11 | 122.2 |
| 15 | 110.7 | 96.6 | 1.15 | 104.8 |
| 16 | 130.9 | 116.9 | 1.12 | 112.9 |
| 17 | 135.2 | 113.9 | 1.19 | 121.3 |
| 18 | 137.5 | 110.5 | 1.24 | 122.6 |
| 19 | 114.2 | 99.1 | 1.15 | 106.2 |
| 20 | 126.1 | 113.5 | 1.11 | 120.3 |
| 21 | 132.6 | 122.8 | 1.08 | 127.6 |
| Mean Value | 121.2 | 104.2 | 1.17 | 112.5 |

[Measurement and Analysis of Optical Characteristics]

[Preparation and Measurement of Samples]

The samples of Embodiments and Comparative Embodiments were irradiated using light having a wavelength of 455 nm, and the luminance and NTSC chromaticity coordinates were measured using the spectroradiometer SR-3A from TOPCON Corp. with a blue filter.

[Analysis of Carbon Content]

The carbon contents of the irregular particles of Embodiments 1 to 7 were analyzed using the carbon/sulfur analyzer CS-800 from ELTRA GmbH.

[Results Analysis]

Table 4 shows the luminance and chromaticity coordinates of the samples of Embodiments and Comparative Embodiments. For the green light that these samples will emit, the shift on x coordinate is more influential for human eyes than the shift on y coordinate. Comparative Embodiments 6 to 9 and Comparative Embodiments 10 to 13 show that, in conditions that the non-irregular cores are used, when the luminance is increased by increasing the adsorption amount of the quantum dots, the x coordinate of the NTSC color gamut shift considerably, even up to about 0.02 to 0.03. In contrast, the results of Embodiments 1 to 7 show that, even when the adsorption amount of the quantum dots is increased up to 50 wt %, the shift of the x coordinate of the NTSC color gamut is only about 0.0046, which is much smaller than the shift of Comparative Embodiments 6 to 13 in which the Cores (3) and Cores (4) are used. At the same time, the luminance can achieve 76.7. In addition to the application of simply increasing the luminance, Embodiments 1 to 7 show that, with the luminescent materials according to the implementations of this disclosure, desired luminance can be provided by adjusting the adsorption amount of the quantum dots (the luminance increases as the adsorption amount increases) without an obvious change of the color. Even in a condition that different cores are used, such as Embodiment 3 in which Cores (2) modified by a different modifier, there are no significant effects on the luminance and chromaticity coordinates. Furthermore, Comparative Embodiments 1 to 5 show that, when no cores are used, even the same amount of quantum dots are provided, the luminance will be worse.

TABLE 4

| | Cores | Adsorption Amount of the Quantum Dots (wt %) | Carbon Content (wt %) | Luminance | NTSC (x, y) x | y |
|---|---|---|---|---|---|---|
| Embodiment 1 | Cores (1) | 0.2 | 0.52 | 6.9 | 0.1821 | 0.6696 |
| Embodiment 2 | Cores (1) | 2.0 | 1.09 | 17.6 | 0.1827 | 0.7254 |
| Embodiment 3 | Cores (1) | 10.0 | 3.03 | 44.9 | 0.1805 | 0.7538 |
| Embodiment 4 | Cores (2) | 20.0 | 5.80 | 61.7 | 0.1832 | 0.7595 |
| Embodiment 5 | Cores (1) | 30.0 | 6.62 | 66.9 | 0.1834 | 0.7610 |
| Embodiment 6 | Cores (1) | 40.0 | 8.55 | 74.1 | 0.1858 | 0.7604 |
| Embodiment 7 | Cores (1) | 50.0 | 10.48 | 76.7 | 0.1867 | 0.7600 |
| Comparative Embodiment 1 | N/A | — | — | 9.7 | 0.1809 | 0.7596 |
| Comparative Embodiment 2 | N/A | — | — | 12.3 | 0.1878 | 0.7579 |
| Comparative Embodiment 3 | N/A | — | — | 28.2 | 0.2156 | 0.7465 |
| Comparative Embodiment 4 | N/A | — | — | 28.4 | 0.2309 | 0.7323 |
| Comparative Embodiment 5 | N/A | — | — | 28.8 | 0.2321 | 0.7293 |
| Comparative Embodiment 6 | Cores (3) | 0.2 | — | 18.8 | 0.1800 | 0.7324 |
| Comparative Embodiment 7 | Cores (3) | 2.0 | — | 49.8 | 0.1818 | 0.7555 |
| Comparative Embodiment 8 | Cores (3) | 10.0 | — | 59.4 | 0.1897 | 0.7544 |
| Comparative Embodiment 9 | Cores (3) | 20.0 | — | 88.2 | 0.2074 | 0.7487 |
| Comparative Embodiment 10 | Cores (4) | 0.2 | — | 3.7 | 0.1733 | 0.6187 |
| Comparative Embodiment 11 | Cores (4) | 2.0 | — | 30.9 | 0.1747 | 0.7553 |
| Comparative Embodiment 12 | Cores (4) | 10.0 | — | 60.8 | 0.1920 | 0.7557 |
| Comparative Embodiment 13 | Cores (4) | 20.0 | — | 83.9 | 0.2038 | 0.7507 |

It will be apparent to those skilled in the art that various modifications and variations can be made to the disclosed implementations and embodiments. It is intended that the specification and examples be considered as exemplary only, with a true scope of the disclosure being indicated by the following claims and their equivalents.

What is claimed is:

1. A luminescent material, comprising:
a particle of an irregular shape, wherein the particle of the irregular shape comprise:
a core of an irregular shape; and
quantum dots distributing on the core;
wherein said irregular shape of the particle is a particle shape with a non-periodical contour on a two-dimensional plane that is not constituted by any repeating geometric shapes selected from the group consisting of circles, ellipses, rectangles, squares, diamonds, triangles, and trapezoids, and wherein said irregular shape of the core is a core shape in a form of truncated spheres with a non-periodical contour on a two-dimensional plane that is not constituted by any repeating geometric shapes selected from the group consisting of circles, ellipses, rectangles, squares, diamonds, triangles, and trapezoids;
wherein the luminescent material comprises a plurality of the particles of the irregular shape, wherein a mean value of ratios of long axes and short axes of the plurality of the particles of the irregular shape is from 2.50 to 10.00; and
wherein the core is hydrophobic, and wherein the core has an end functional group as shown in Chemical Formula 1 on its surface:

[Chemical Formula 1]

wherein $R^1$ is —$OCH_3$, $R^2$ is —$OCH_3$, and $R^3$ is a C3-C20 alkyl group.

2. The luminescent material according to claim 1, wherein the particle further comprise:
a sealing layer sealing the core, wherein the quantum dots distributing on the core are located between the core and the sealing layer.

3. The luminescent material according to claim 1, wherein a ratio of a long axis and a short axis of the particle of the irregular shape is from 1.30 to 20.00.

4. The luminescent material according to claim 1, wherein a ratio of a long axis and a short axis of the particle of the irregular shape is from 1.40 to 18.00.

5. The luminescent material according to claim 1, wherein a ratio of a long axis and a short axis of the particle of the irregular shape is from 1.50 to 15.00.

6. The luminescent material according to claim 1, wherein a standard deviation of ratios of long axes and short axes of the plurality of the particles of the irregular shape is from 0.10 to 9.00.

7. The luminescent material according to claim 1, wherein a difference between maximum and minimum of ratios of long axes and short axes of the plurality of the particles of the irregular shape is from 0.20 to 30.00.

8. The luminescent material according to claim 1, wherein the core comprising an alkyl group having 3 carbons to 20 carbons.

9. The luminescent material according to claim 1, wherein the core comprising an alkyl group having 3 carbons to 18 carbons.

10. The luminescent material according to claim 1, wherein the core comprising an alkyl group having 3 carbons to 16 carbons.

11. The luminescent material according to claim 1, wherein a material of the core is fumed silica.

12. The luminescent material according to claim 2, wherein a material of the sealing layer is selected from the group consisting of polysiloxane, glass, and $SiO_2$.

13. The luminescent material according to claim 1, wherein a carbon content of the particle is from 0.50 wt % to 11.00 wt % with respect to 100 wt % of a total weight of the particle.

14. An electronic device having a display function, comprising:
   a luminescent material according to claim 1;
   wherein the electronic device is a television, a digital camera, a digital video camera, a digital photo frame, a mobile phone, a laptop, a computer monitor, a music player, a video game console, a car monitor, a smartwatch, or a VR glasses.

* * * * *